(12) United States Patent
Martin et al.

(10) Patent No.: US 10,526,758 B1
(45) Date of Patent: Jan. 7, 2020

(54) HELICAL PILE FOUNDATION SYSTEM

(71) Applicant: Gregory Enterprises, Inc., Ada, OK (US)

(72) Inventors: Justin E. Martin, Tupelo, OK (US); Darin Willis, Plano, TX (US)

(73) Assignee: Gregory Enterprises, Inc., Ada, OK (US)

( * ) Notice: Subject to any disclaimer, the term of this patent is extended or adjusted under 35 U.S.C. 154(b) by 0 days.

(21) Appl. No.: 16/122,840

(22) Filed: Sep. 5, 2018

(51) Int. Cl.
*E04H 12/22* (2006.01)
*E01F 9/685* (2016.01)
*E02D 27/42* (2006.01)

(52) U.S. Cl.
CPC .............. *E01F 9/685* (2016.02); *E02D 27/42* (2013.01); *E04H 12/2223* (2013.01); *E02D 2200/1685* (2013.01); *E02D 2300/0029* (2013.01); *E02D 2300/0032* (2013.01)

(58) Field of Classification Search
CPC ....... E02D 5/80; E04H 12/22; E04H 12/2215; E04H 12/2223; E04H 12/2238; G09F 15/0062; G09F 15/0037
USPC .............. 40/607.04, 607.05, 607.07, 607.08; 52/153, 165; 248/156
See application file for complete search history.

(56) References Cited

U.S. PATENT DOCUMENTS

| | | | | |
|---|---|---|---|---|
| 819,637 A | * | 5/1906 | Diescher | E04H 17/10 256/57 |
| 1,373,560 A | * | 4/1921 | Holland | E04H 12/2223 248/156 |
| 3,011,598 A | * | 12/1961 | Galloway | E04H 12/2223 52/153 |
| 4,249,715 A | * | 2/1981 | Repp | E01F 9/685 248/156 |
| 4,269,010 A | * | 5/1981 | Glass | E04H 17/08 52/154 |
| 4,378,650 A | * | 4/1983 | Ottoson | E02D 5/80 40/607.06 |
| 4,530,190 A | * | 7/1985 | Goodman | E02D 5/80 175/23 |
| 4,858,876 A | * | 8/1989 | Moreno | E04H 12/2223 248/545 |
| 4,926,592 A | * | 5/1990 | Nehls | E01F 9/681 256/13.1 |
| 5,148,641 A | * | 9/1992 | Rushing | G01C 15/04 52/103 |
| 5,661,932 A | * | 9/1997 | Barefield | E02D 5/80 52/154 |
| 5,699,864 A | * | 12/1997 | Dvorak | E04H 12/2215 173/128 |

(Continued)

FOREIGN PATENT DOCUMENTS

GB  2435484 A * 8/2007 ......... E04H 12/2215

*Primary Examiner* — Frederick L Lagman
(74) *Attorney, Agent, or Firm* — McAfee & Taft

(57) ABSTRACT

A post foundation system is provided. The system has a shaft with a helical disk attached to one end and a post support attached to the other end. The helical disk drives the shaft into the ground as a rotational force is applied to the shaft. A fin section is rotatably coupled about the shaft between its first and second ends. The fin section can have one or more fins extending outwardly from the shaft. The fin section engages the ground to stabilize the post foundation system as the shaft of the post foundation system is driven into the ground.

16 Claims, 1 Drawing Sheet

(56) References Cited

U.S. PATENT DOCUMENTS

| | | | | |
|---|---|---|---|---|
| 5,881,978 A * | 3/1999 | Rust | ............... | E04H 12/2215 |
| | | | | 109/52 |
| 5,899,030 A * | 5/1999 | Barefield | ............... | E02D 5/80 |
| | | | | 403/374.1 |
| 6,263,622 B1 * | 7/2001 | Griffin | ............... | E02D 5/801 |
| | | | | 52/153 |
| 6,422,783 B1 * | 7/2002 | Jordan | ............... | E01F 9/685 |
| | | | | 256/13.1 |
| 6,540,196 B1 * | 4/2003 | Ellsworth | ............... | E01F 9/642 |
| | | | | 248/548 |
| 6,868,641 B2 * | 3/2005 | Conner | ............... | E01F 9/635 |
| | | | | 52/165 |
| 7,241,079 B2 * | 7/2007 | Francis | ............... | E02D 5/56 |
| | | | | 248/530 |
| 9,441,336 B2 * | 9/2016 | Leahy | ............... | E01F 9/635 |
| 2009/0165403 A1 * | 7/2009 | Reinert, Sr. | ............... | E02D 27/42 |
| | | | | 52/165 |
| 2013/0327915 A1 * | 12/2013 | O'Neal | ............... | F16M 11/00 |
| | | | | 248/545 |

\* cited by examiner

HELICAL PILE FOUNDATION SYSTEM

TECHNICAL FIELD

The invention generally relates to sign foundations and, more specifically, to a helical pile used as a foundation base for a roadway sign.

BACKGROUND

Typically, roadway signs comprise a sign and a post to which the sign is attached. In some cases, roadway signs are installed by simply driving the post into the ground at the desired location. In other cases, roadway sign posts are implanted in a concrete encasement which is buried in the ground.

SUMMARY

Various embodiments of the invention are directed to an improved foundation system for roadway signage and other posts. Typical sign post foundations suffer from a number of drawbacks. When sign posts are simply driven into the ground, there is very little lateral support and any support is determined by the integrity of the earth into which the post is driven. Weak or moving soil, or soil erosion, can quickly cause a sign to lean or fall. Signs that utilize concrete foundations likewise have drawbacks. The concrete foundations themselves often fail over time. Heating and cooling can cause gaps between the sign post and the concrete encasement. Moreover, the process of installing a sign with a concrete foundation is time consuming in that the sign must be installed in at least two discrete steps. First, the concrete must be poured and then properly cured. Then, after a period of time, the sign post is installed. This presents particular problems in remote areas as travel time between the installation site and manufacturing facility is doubled. All of the above drawbacks can lead to increased cost incurred in a roadway sign installation project.

Certain embodiments of the present invention utilize a helical pile as the foundation base for roadway signage. In certain cases, this increases the lateral strength of the sign (or sign post) to allow for meeting code requirements in multiple soil types. Certain aspects of the invention further address the lack of lateral resistance usually associated with the slender shaft of a helical pile in a foundation application. Various embodiments of the invention also reduce the number of installation steps and the time needed to complete installation.

In one example embodiment the invention is a post foundation system, which includes a shaft having a first and a second end. A helical disk is affixed to or located at the first end of the shaft and a post support is affixed to or located at the second end of the shaft. The system further includes a fin section rotatably coupled about the shaft between the first and second ends of the shaft. The fin section may be adapted to engage the ground as the post foundation system is driven into the ground in order to help provide stability to the post foundation.

DETAILED DESCRIPTION

Figure 1:
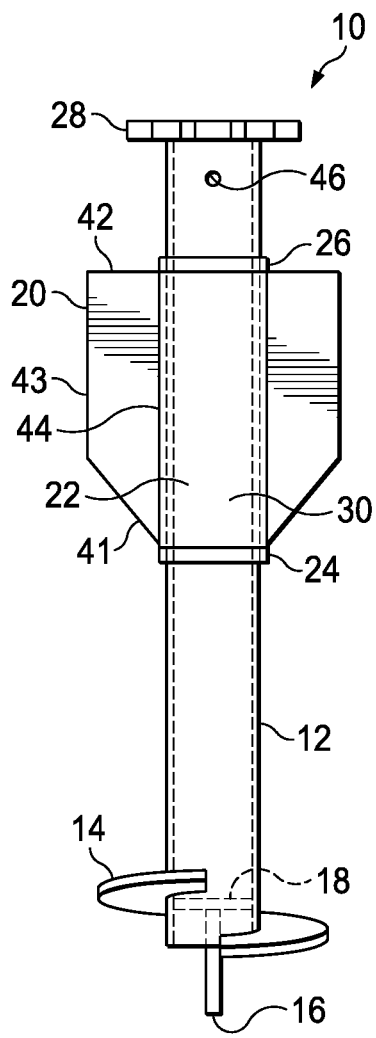
FIG. 1 is an elevation view of a foundation system in accordance with an example embodiment.

In certain embodiments a foundation base system is provided for mounting different types of sign posts and for other applications. In an example embodiment as shown in FIG. 1, a foundation system 10 includes a shaft 12. The shaft can be of any suitable dimensions, such as length, inner and outer diameter, wall thickness, etc. In this example, the shaft is shown as being cylindrical with a circular cross-section. In certain applications, a circular, cylindrical shaft may be preferable. For example, a circular, cylindrical shaft may provide a lower amount of resistance when the foundation is driven into soil than a cylindrical shaft having a square cross-section for example. However, the invention also encompasses shafts that are partly solid and with differing cross-sectional shapes.

In certain applications, such as when the foundation base system is used for installing common roadway signs (e.g., a stop sign or a speed limit sign), the dimensions of the shaft can become important. In such cases, it is preferable that the shaft is from about 30 to about 60 inches long, circular in cross-section, with an outside diameter of from about 2.5 to about 10 inches and an inside diameter of from about 2 to about 9 inches. Even more preferably, the length is about 39 inches, the outside diameter is about 4 inches and the inside diameter is about 3.5 inches. The reason for these preferred dimensions is so that the foundation base will accommodate sign posts having conventional, or standard, dimensions. Another reason is so that the foundation base provides acceptable support (e.g., resistance to lateral force within a certain range) and so that cost of the foundation base is minimized. The shaft (as well as the other components of the foundation base system) may be made from steel. However, it is within the scope of the invention to utilize different materials from some or all of the components.

A soil plug 18 is welded, or otherwise attached, to the inside lower part of a main shaft at or near the distal end of shaft 12 that will be driven into the ground. Soil plug 18 prevents excessive soil from collecting within the shaft as foundation system 10 is advanced into the soil. A helical disk 14 is welded, or otherwise mounted, to the outside of shaft 12. Preferably, helical disk 14 is attached to shaft 12 at, or near a distal end thereof, which is the end that will be driven into the ground. A starter tip 16 is welding to a bottom side of soil plug 18. Preferably, starter tip 16 comprises a "twist tip" to open the earth for shaft 12 to be pulled into the ground via the downward pull of helical disk 14. Shaft 12 may be advanced with the use of a hydraulic torque motor.

A fin section 22 is mounted about shaft 12. Preferably, fin section 22 is positioned so that its bottom edge is approximately from about 12 inches to about 18 inches above the ground end of shaft 12. This is so the fin section is buried an acceptable distance into the ground when foundation system 10 is at its preferred depth. It should be noted that the length of shaft 12, the positioning of fin section 22 and the shape and dimensions of the fin section and other components may be modified within the scope of the invention to accommodate a number of factors such as sign type, sign size, post type and size, soil conditions, sheer force requirements, etc.

Figure 2:
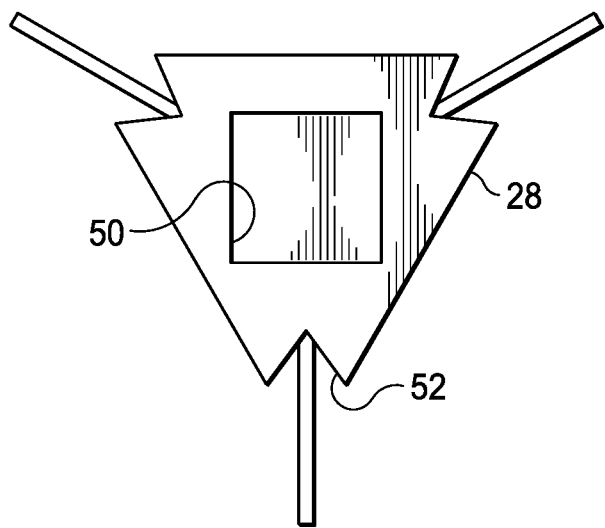
FIG. 2 is a plan view of a base plate and fins of the foundation system of FIG. 1.

In one example embodiment, fin section 22 comprises a sleeve 30 to which one or more fins 20 are attached. Preferably, sleeve 30 has the same cross-sectional shape as shaft 12 with an inside diameter slightly larger than the outside diameter of shaft 12. In one example embodiment, a plurality of fins 20 is attached. In the example shown in FIGS. 1 and 2, three fins 20 are attached to sleeve 30 and are spaced equidistant about the exterior surface of sleeve 30. It should be noted that fins 20 may be made from any suitable material including, for example, steel plate. It should also be noted that the number of fins may be greater than, or less than, the three fins illustrated in the example embodiment.

In the illustrated example, fins 20 have a leading edge 41, a trailing edge 42, an outer edge 43, and an inner edge 44. Inner edge 44 is the edge that is mounted to sleeve 30. Leading edge 41 is angled from a point where it meets inner edge 44 to a point where it meets outer edge 43. Trailing edge is even, or level, from inner edge 44 to outer edge 43. In this regard, outer edge 43 is shorter than inner edge 44. In certain cases, this general shape of fins 20 is preferable in order to create a wedge effect as fin section 22 is advanced into the ground and to save material in the formation of the fins. Preferably, inner edge 44 is from about 12 inches to about 24 inches in length. Preferably, outer edge 43 is from about 8 inches to about 20 inches in length. Preferably, trailing edge 42 (or the lateral distance between inner and outer edges 44 and 43) is from about 4 inches to about 12 inches in length. Preferably, the angle of leading edge 41 is from about 30 degrees to about 45 degrees. Among other things, these dimensions create fins that have an appropriate surface area to provide sufficient lateral support for common roadway signs. Of course, as stated elsewhere herein, it should be noted that the fin shape and dimensions may be modified to account for different factors.

A first sleeve retainer ring 24 is welded, or otherwise attached, to shaft 12 to hold the lower part of the fin section in place on shaft 12. Fin section 22 may be mounted onto shaft 12 such that the leading (or bottom) end of sleeve 30 abuts first sleeve retainer ring 24. A second sleeve retainer ring 26 is provided at the opposite end of sleeve 30 (i.e., above sleeve 30) to hold fin section 22 in place along the length of shaft 12.

Fin section 22 rotates freely about shaft 12. Therefore, as foundation system 10 is advanced into the ground, and as the leading edges of fins 20 come in contact with the soil, fin section 22 does not rotate as shaft 12 continues to rotate.

In the example embodiment two opposing bolt holes 46 are drilled through shaft 12. Common sign posts have perforations at least in the region near the ground end. Bolt holes 46 are aligned such that when a sign post is inserted into shaft 12 of foundation system 10, a bolt may be inserted through bolt holes 46 and likewise through a set of opposing perforations on the sign post. In this manner, up and down movement of the sign post, once mounted in foundation system 10, is restricted. Additional pairs of bolt holes may also be incorporated.

A slip joint base 28 is welded, or otherwise attached, to the top distal end of shaft 12. Slip joint base 28 is illustrated in greater detail in FIG. 2. Base 28 preferably has a square, centered opening 50 to accept an end of a typical sign post. Thus, base 28 accepts both perforated sign posts and slip-base posts.

Perforated sign post support systems are generally designed to meet NCHRP 350 breakaway standards. In addition, the square post is easily installed. Perforated posts range in size from 1½ to 2½ inches in diameter or width. Various embodiments of the present invention can accept all of these and support them as a base. Slip-base or breakaway systems are designed to be mounted to the foundation base system and, upon impact, the breakaway system will release the post and sign from the base. The breakaway system is designed to use the perforated sign post as well as round tubing for sign structures. Various embodiments of the present invention can accommodate these types of systems.

It should be noted that opening 50 may have other shapes to accommodate differently shaped posts and/or other applications. Base 28 is shown with a generally triangular shape to match the break-away systems commonly used by most departments of transportation. It should be noted, however, that the base may have other shapes to accommodate different types of break-away systems, different types of posts (e.g., larger posts), and/or different applications. Base 28 has notches 52 at each corner. Notches 52 allow access for bolts which typically extend from an upper side of a matching plate on a slip-type post to the lower side of base 28 (not shown). This bolt system holds the base of the post (not shown) to the top of foundation system 10.

It should be noted that different modifications can be incorporated into the various embodiments to accommodate a wide array of signage options. Preferably, the length of the foundation system is set to stay above buried lines along roadways but can be lengthened for larger loads. The "slip base" (i.e., base 28 in FIG. 2) can be exchanged to fit a variety of sign posts. The helical disk 14 can be scaled to meet different soil and load requirements. Other modifications will be apparent to those having ordinary skill in the art.

As should be apparent to one of ordinary skill in the art, many more aspects and alternatives are well within the scope of the invention, which is defined by the following claims.

What is claimed is:

1. A post foundation system, comprising:
   a shaft having a first and a second end;
   a helical disk affixed to the first end of the shaft;
   a first retainer ring affixed to said shaft;
   a second retainer ring affixed to said shaft;
   a post support affixed to the second end of the shaft; and
   a fin section rotatably coupled about the shaft between the first and second retainer rings, said first and second retainer rings hold said fin section at a predetermined longitudinal position.

2. The post foundation system of claim 1, further comprising:
   a starter tip affixed to the first end of the shaft.

3. The post foundation system of claim 1, wherein the shaft is tubular.

4. The post foundation system of claim 1, wherein the post support comprises a plate having a post receptacle formed in a central portion thereof.

5. The post foundation system of claim 4, wherein the plate has a generally triangular planar shape.

6. The post foundation system of claim 5, wherein at least one tip of the triangular shaped plate is notched to provide access to a connection device for connecting the plate to the shaft.

7. The post foundation system of claim 4, wherein the post receptacle is square.

8. The post foundation system of claim 4, wherein the post receptacle is round.

9. The post foundation system of claim 1, wherein the fin section comprises a shaft and at least one fin extending outward from the shaft.

10. The post foundation system of claim 9, wherein the shaft of the fin section has an inner diameter slightly larger than an outer diameter of the shaft of the post foundation system so that the fin section shaft is rotatable about the post foundation system shaft.

11. The post foundation system of claim 9, wherein the fin section comprises a plurality of fins.

12. The post foundation system of claim 9, wherein the fin section comprises three fins.

13. The post foundation system of claim 11, wherein the fins are spaced equidistant from one another about the shaft of the fin section.

14. The post foundation system of claim 9, wherein the at least one fin has a leading edge facing the first end of the post foundation system, the leading edge angled toward the second end of the post foundation system as the leading edge extends away from the fin section shaft.

15. The post foundation system of claim 9, wherein the at least one fin has a leading edge facing the first end of the post foundation system, the leading edge angled away from the second end of the post foundation system as the leading edge extends away from the fin section shaft.

16. A post foundation system, comprising:
   a shaft having a first and a second end;
   a first retainer ring affixed to said shaft;
   a second retainer ring affixed to said shaft;
   a helical disk affixed to the first end of the shaft, the helical disk adapted to drive the shaft into the ground as a rotational force is applied to the shaft;
   a post support affixed to the second end of the shaft, the post support having a receptacle to hold a post therein; and
   a fin section rotatably coupled about the shaft between the first and second retainer rings, said first and second retainer rings hold said fin section at a predetermined longitudinal position and the fin section having at least one fin adapted to engage the ground to stabilize the post foundation system as the shaft of the post foundation system is driven into the ground.

* * * * *